(12) United States Patent
Kikuchi et al.

(10) Patent No.: US 10,699,544 B2
(45) Date of Patent: Jun. 30, 2020

(54) COMMUNICATION MANAGEMENT SYSTEM OF SURVEYING INSTRUMENT

(71) Applicant: TOPCON CORPORATION, Tokyo (JP)

(72) Inventors: Takeshi Kikuchi, Tokyo (JP); Mitsutaka Kagata, Tokyo (JP); Sora Otaguro, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 16/606,058

(22) PCT Filed: Jun. 14, 2018

(86) PCT No.: PCT/JP2018/022715
§ 371 (c)(1),
(2) Date: Oct. 17, 2019

(87) PCT Pub. No.: WO2019/003938
PCT Pub. Date: Jan. 3, 2019

(65) Prior Publication Data
US 2020/0043310 A1 Feb. 6, 2020

(30) Foreign Application Priority Data
Jun. 28, 2017 (JP) ................... 2017-125783

(51) Int. Cl.
*G08B 13/22* (2006.01)
*G01C 15/00* (2006.01)
(Continued)

(52) U.S. Cl.
CPC ............ *G08B 13/22* (2013.01); *G01C 15/00* (2013.01); *G08C 17/02* (2013.01); *H04W 88/02* (2013.01)

(58) Field of Classification Search
CPC ........ G01C 15/00; G06Q 50/10; G08B 13/14; G08B 13/22; G08C 15/00; G08C 17/02; H04M 11/00; H04Q 9/00; H04W 88/02
See application file for complete search history.

(56) References Cited

U.S. PATENT DOCUMENTS

2006/0016085 A1  1/2006  Imamura et al.
2012/0133918 A1  5/2012  Sakimura et al.
(Continued)

FOREIGN PATENT DOCUMENTS

JP    6-241802 A    9/1994
JP    2006-38581 A    2/2006
(Continued)

*Primary Examiner* — Nader Bolourchi
(74) *Attorney, Agent, or Firm* — Roberts Calderon Safran & Cole P.C.

(57) ABSTRACT

In order to achieve the object, a communication management system includes: a surveying instrument including a survey unit, a system timer, a control unit, and a communication unit; a management server capable of communicating with the surveying instrument; and a remote terminal capable of communicating with the management server, wherein the remote terminal sets a usable time of the surveying instrument, sets determination on an operating time of the surveying instrument and the usable time, and an operation responding to results of the determination, and makes the management server store these, the surveying instrument transmits an operation start time and an operation end time to the management server, and the management server acquires the operation start time and the operation end time, and compares the usable time and an operating time of the surveying instrument and executes the determination, and executes the operation based on results of the determination.

4 Claims, 5 Drawing Sheets

(51) Int. Cl.
  *G08C 17/02* (2006.01)
  *H04W 88/02* (2009.01)

(56) References Cited

U.S. PATENT DOCUMENTS

2015/0240988 A1   8/2015  White
2019/0004157 A1*  1/2019  Kikuchi ............... G01S 7/4808

FOREIGN PATENT DOCUMENTS

| JP | 2007-170978 A | 7/2007 |
| JP | 2012-117874 A | 6/2012 |
| JP | 2016-223904 A | 12/2016 |

* cited by examiner

COMMUNICATION MANAGEMENT SYSTEM OF SURVEYING INSTRUMENT

CROSS-REFERENCE TO RELATED APPLICATIONS

The present application is a U.S. National Phase of PCT/JP2018/022715 filed on Jun. 14, 2018 claiming priority to Japanese Patent Application No. 2017-125783 filed on Jun. 28, 2017. The disclosure of the PCT Application is hereby incorporated by reference into the present Application.

TECHNICAL FIELD

The present invention relates to a communication management system configured to prevent an unauthorized use of a surveying instrument.

BACKGROUND ART

A surveying instrument (total station) is an apparatus to survey a target by irradiating distance-measuring light onto the target placed at a measurement point and receiving light reflected from the target. Since surveying instruments are expensive apparatuses, they are often targets of theft.

To counter theft, the system disclosed in Patent Literature 1 is configured to transmit a serial number unique to a surveying instrument from the surveying instrument to a management company. When receiving a report of a theft of a surveying instrument from an owner of the surveying instrument, the management company compares the serial number of the surveying instrument and a serial number in a database, and when these numbers match, a management command is transmitted from the management company to the surveying instrument, and the functions of the surveying instrument are suspended.

CITATION LIST

Patent Literature

[Patent Literature 1] Japanese Published Unexamined Patent Application Publication No. 2007-170978

SUMMARY OF THE INVENTION

Technical Problem

Although a system configured to counter theft by using a number unique to a surveying instrument as described above is conventionally available, in this system, in a case where a surveying instrument is used by a third party at a time not expected by an owner, the owner cannot know this fact. When the surveying instrument is used at a time not expected by an owner, there is a suspicion of an unauthorized use such as theft or use for improper purposes of the surveying instrument.

An object of the present invention is to provide a communication management system of a surveying instrument, capable of quickly making a response to an unauthorized use including theft, etc., of the surveying instrument.

Solution to Problem

In order to solve the above-described problem, a communication management system according to an aspect of the present invention includes: a surveying instrument including a survey unit configured to survey a target, a system timer configured to acquire a current time, a control unit configured to control the survey unit and the system timer, and a communication unit configured to enable communication between the control unit and a communication network; a management server capable of communicating with the surveying instrument through the communication network; and a remote terminal capable of communicating with the management server, wherein the remote terminal sets a usable time of the surveying instrument, sets determination on an operating time of the surveying instrument and the usable time, and an operation responsive to results of the determination, and makes the management server store the usable time, the determination, and the operation, the surveying instrument transmits an operation start time when own power supply was turned ON and an operation end time when the power supply was turned OFF to the management server, and the management server acquires the operation start time and the operation end time, and compares the usable time and an operating time of the surveying instrument and executes the determination, and based on results of the determination, executes the operation.

In the aspect described above, it is also preferable that, when the operating time of the surveying instrument is determined to be outside the usable time in the determination, as the operation, the server sends a notification to an owner and/or an administrator of the surveying instrument, and/or gives a warning to the surveying instrument and/or suspends functions of the surveying instrument.

In the aspect described above, it is also preferable that the remote terminal is capable of setting the usable time in a weekly schedule by day of week.

Effect of Invention

The communication management system of the present invention enables a quick response to an unauthorized use of a surveying instrument.

DESCRIPTION OF EMBODIMENTS

Next, a preferred embodiment of the present invention is described with reference to the drawings.

Entire Configuration of System

Figure 1:
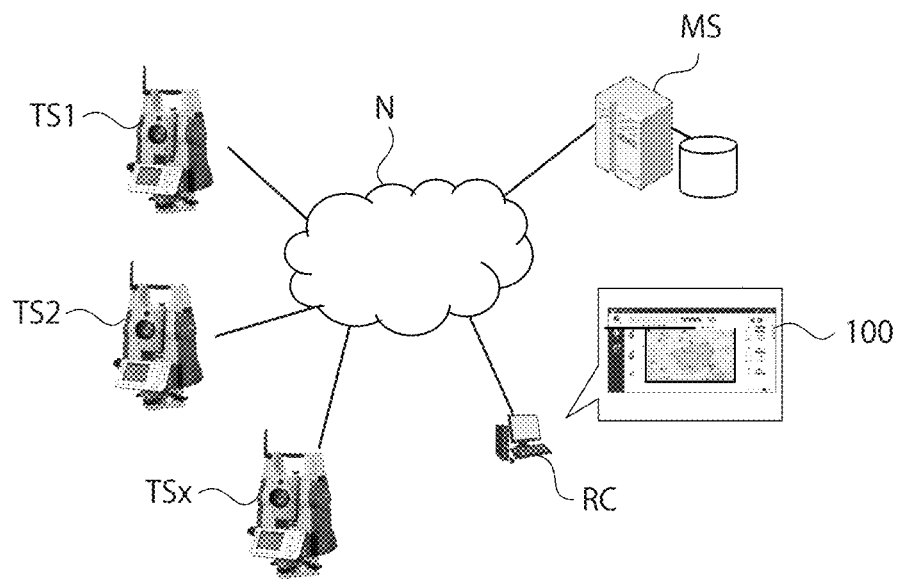
FIG. 1 is a view illustrating an entire configuration of a communication management system according to an embodiment of the present invention.

FIG. 1 is a view illustrating an entire configuration of a communication management system (hereinafter, simply referred to as a system) according to an embodiment of the present invention. In FIG. 1, reference signs TS1, TS2, and TSx (hereinafter, TS is used as a representative sign) denote some of a plurality of surveying instruments to be managed, and the reference sign MS denotes a management server, and the reference sign RC denotes a remote terminal. The surveying instruments TS1, TS2, and TSx, the management server MS, and the remote terminal RC are capable of communicating with each other via a communication network N such as the Internet. The communication network N may include arbitrary communication networks including a local area network such as an internal LAN, a connection cable, and a satellite communication network.

Configuration of Surveying Instrument

Figure 2:
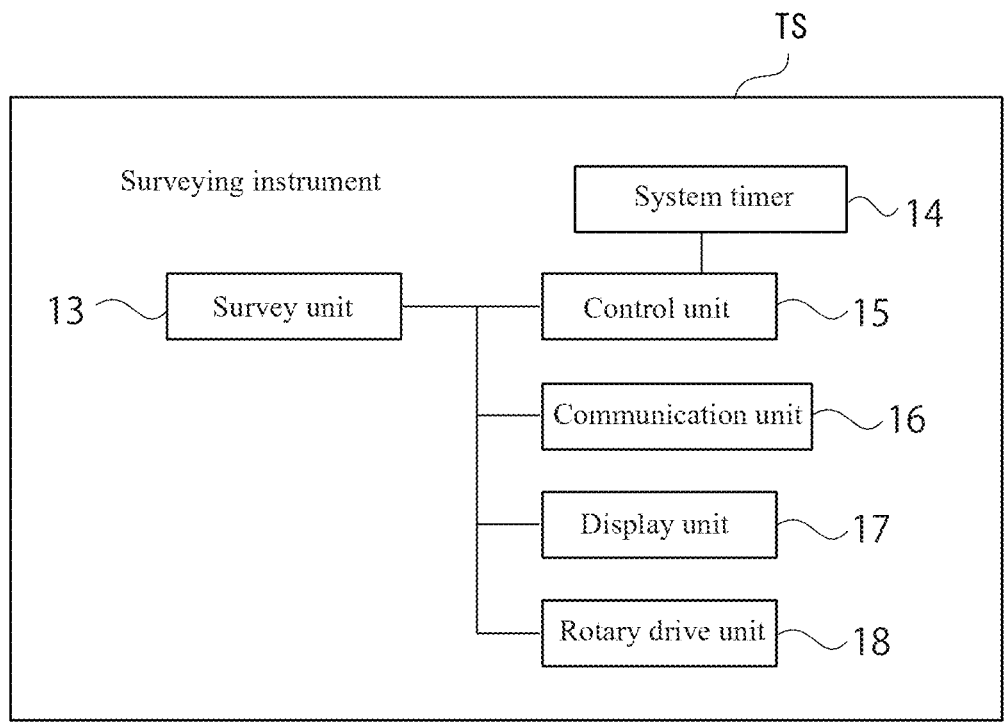
FIG. 2 is a configuration block diagram of a surveying instrument according to the embodiment.

FIG. 2 is a configuration block diagram of a surveying instrument according to the embodiment. The surveying instrument TS is a total station (electronic distance and angle measuring instrument). As illustrated in FIG. 2, the surveying instrument TS includes a survey unit 13, a system timer 14, a control unit 15, a communication unit 16, a display unit 17, and a rotary drive unit 18. The surveying instrument may be configured so that the communication unit 16 is retrofitted (externally fitted) to the surveying instrument TS.

The survey unit 13 includes a light emitting element, a distance-measuring optical system, and a light receiving element disposed inside a telescope (not illustrated) of the surveying instrument TS. The survey unit 13 emits distance-measuring light from the light emitting element via the distance-measuring optical system and receives reflected light from a target by the light receiving element to measure a distance to the target. The survey unit 13 measures a vertical rotation angle of the telescope and a horizontal rotation angle of a housing (not illustrated) of the telescope by rotary encoders.

The system timer 14 uses an operation clock of a CPU of the control unit 15 described below as an original oscillator, and includes a hardware timer that counts clock pulses of the clock, and a software timer that generates interruption processing synchronously with the hardware timer and counts carries. The system timer 14 acquires a current time (system time) of the surveying instrument TS by operating count values of the hardware timer and the software timer. The system timer 14 may correct the system time as necessary when the system timer 14 can acquire a UTC time through the communication network N or from GPS information when the surveying instrument TS includes a GPS device.

The communication unit 16 enables communication with the communication network N, and makes a connection to the Internet by using, for example, an internet protocol (TCP/IP). The display unit 17 has a liquid crystal screen, and survey conditions, etc., can be input therein, and various information on a survey are displayed. The rotary drive unit 18 is a motor, including a motor to vertically rotate the telescope and a motor to horizontally rotate the housing.

The control unit 15 is a control unit including at least a CPU and a memory (ROM, RAM, etc.). The control unit 15 executes a survey application program and makes the display unit 17 display a screen according to the application. The control unit 15 acquires survey data of a measurement point by performing automatic leveling, a distance measurement and an angle measurement of a target by driving the survey unit 13 and the rotary drive unit 18. In addition, the control unit 15 transmits and receives information to and from the management server MS through the communication network N by using the communication unit 16, and executes a command from the management server MS. Further, the control unit 15 acquires an operation start time when the power supply was turned ON and an operation end time when the power supply was turned OFF from the system timer 14. The operation start time and the operation end time are automatically transmitted when the power supply of the surveying instrument TS is turned ON, or at a constant frequency such as once an hour or at least once a day. In the memory of the control unit 15, survey data and various programs for the above-described process are stored.

Configuration of Remote Terminal

Figure 3:
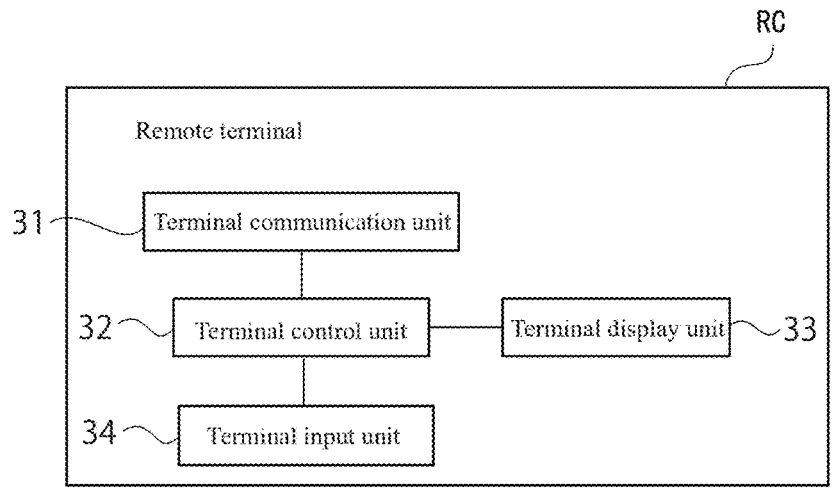
FIG. 3 is a configuration block diagram of a remote terminal according to the embodiment.

FIG. 3 is a configuration block diagram of a remote terminal according to the embodiment. The remote terminal RC is a terminal such as a personal computer, a smartphone, a tablet, etc., owned by a surveying instrument manufacturer or agent. The remote terminal RC includes at least a terminal communication unit 31, a terminal control unit 32, a terminal display unit 33, and a terminal input unit 34 as illustrated in FIG. 3.

The terminal communication unit 31 can transmit and receive information to and from a server communication unit 41 of the management server MS described below via the communication network N.

The terminal input unit 34 is, for example, a keyboard, etc., and can input various settings described below.

The terminal control unit 32 is a control unit including at least a CPU and a memory (ROM, RAM, etc.). The terminal control unit 32 sets a usable time of a surveying instrument (hereinafter, denoted by a reference sign TSx) to be set this time. In addition, the terminal control unit 32 sets determination on an operating time of the surveying instrument TSx and the usable time. Also, the terminal control unit 32 sets an operation responsive to results of the determination. Hereinafter, these are described in detail.

Figure 4:
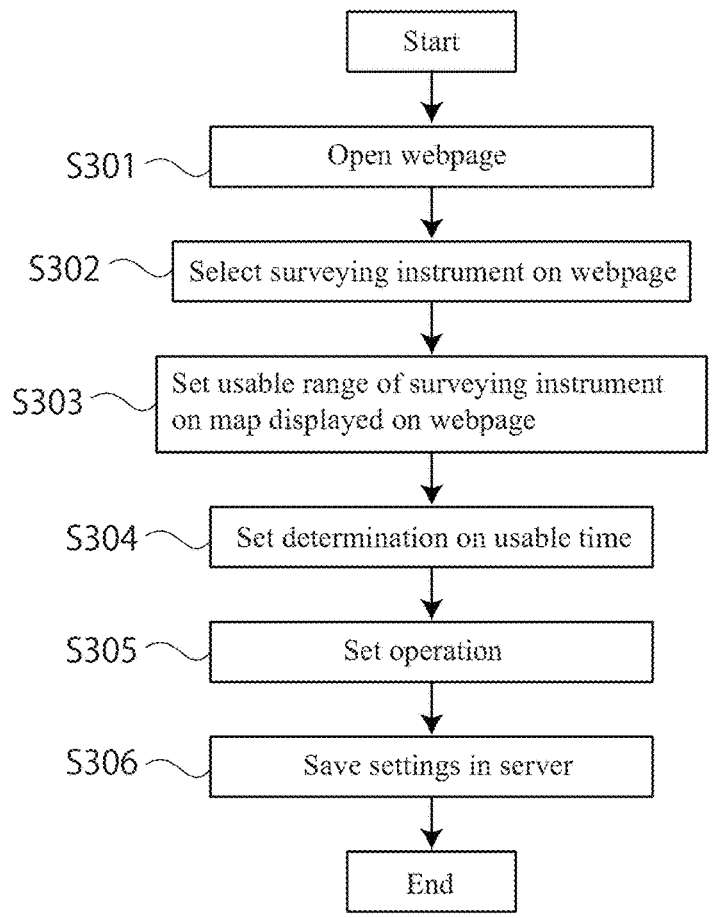
FIG. 4 is a flowchart at the time of setting of the communication management system according to the embodiment.

FIG. 4 is a flowchart at the time of setting of the communication management system according to the embodiment. First, in Step S301, an administrator of the surveying instrument TSx logs into an exclusive webpage 100 provided by a surveying instrument manufacturer from the remote terminal RC.

Next, when the process shifts to Step S302, a list of a plurality of registered surveying instruments is displayed on the terminal display unit 33, and the administrator selects a surveying instrument TSx to be set this time.

Next, when the process shifts to Step S303, a screen for setting a usable time of the surveying instrument TSx is displayed. On the webpage 100, an interface capable of specifying a usable time by a calendar or clock indication is implemented. The administrator sets a usable time of the surveying instrument TSx on the webpage 100.

Figure 5:
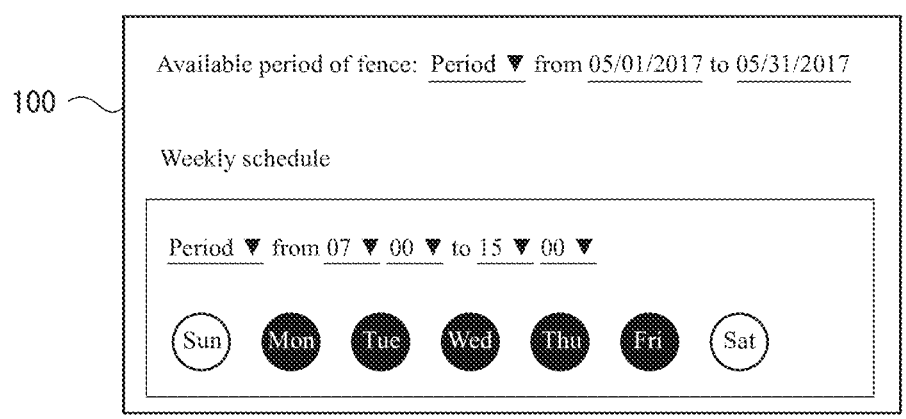
FIG. 5 is an example of a webpage at the time of setting.
Figure 6:
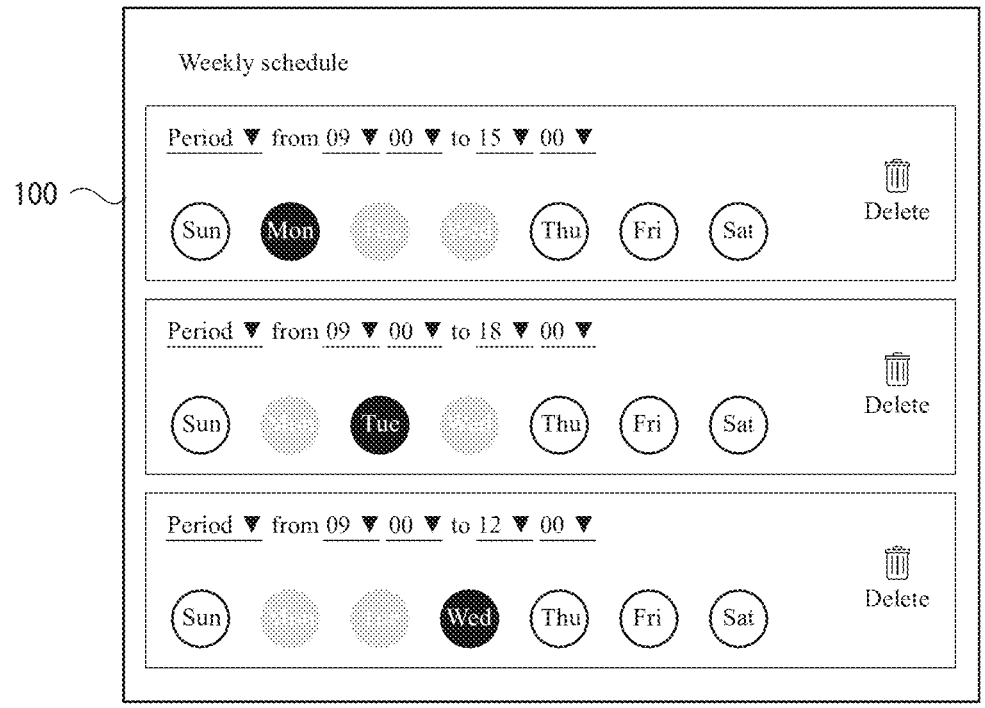
FIG. 6 is an example of a webpage at the time of setting.

FIG. 5 and FIG. 6 illustrate examples of webpages at the time of setting, being examples of setting of a usable time of the surveying instrument TSx. A usable time of the surveying instrument TSx can be selected by arbitrarily combining "month/day/year," "hr/min," and "day of the week" as illustrated in FIG. 5. Alternatively, as illustrated in FIG. 6, a usable time can be set for a weekly schedule for each day of the week, such as from 9:00 to 15:00 on Mondays, from 9:00 to 18:00 on Tuesdays, and from 9:00 to 12:00 on Wednesdays.

Next, when the process shifts to Step S304, a setting field for determination on the usable time set in Step S303 is displayed on the webpage 100. In the setting field for determination, for example, a plurality of options are displayed so as to be selectable by a pull-down menu method or check boxes. As options, for example, "When used outside the usable time," "when used within the usable time," "Moment when operating time goes out of the usable time from inside the usable time," or "Moment when operating time enters the usable time from outside the usable time," etc., are displayed. The configuration may be made so that the administrator can arbitrarily add options. The administrator sets determination (determination criteria) according to his/her own management intentions.

Next, when the process shifts to Step S305, a setting field for an operation responding to the determination set in Step S304 is displayed on the webpage 100. In the setting field for an operation, for example, a plurality of options are displayed so as to be selectable by a pull-down menu method or check boxes. As options, for example, "Send notification to registered e-mail address," "Notify on webpage," "Display warning on surveying instrument," and "Lock (suspend functions of) surveying instrument," etc., are displayed. The configuration may be made so that the administrator can arbitrarily add options. The administrator sets an operation or a plurality of operations according to his/her own management intentions.

Next, the process shifts to Step S306, and the terminal control unit 32 transmits information on the usable time, the determination, and the operation set in Step S303 to S305 described above to the management server MS via the terminal communication unit 31. The terminal control unit 32 ends the setting program when receiving a normal reception response from the management server MS.

Configuration of Management Server

Figure 7:
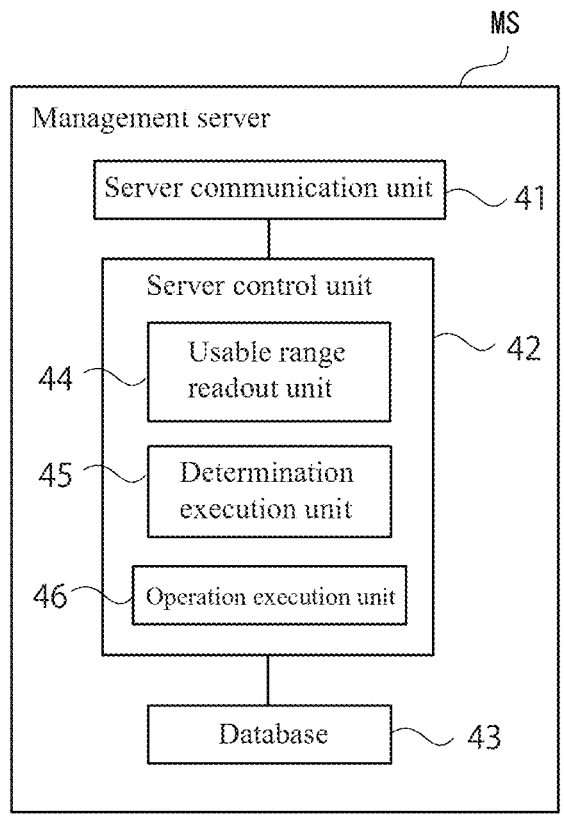
FIG. 7 is a configuration block diagram of a management server according to the embodiment.

FIG. 7 is a configuration block diagram of a management server according to the embodiment. The management server MS includes, as illustrated in FIG. 7, at least a server communication unit 41, a server control unit 42, and a database 43.

The server communication unit 41 can transmit and receive information to and from the communication unit 16 of the surveying instrument TS and the terminal communication unit 31 via the communication network N.

In the database 43, information received from the surveying instrument TS and the remote terminal RC are stored in association with a management number of the surveying instrument TS.

The server control unit 42 is a control unit including at least a CPU and a memory (ROM, RAM, etc.). The server control unit 42 includes, as illustrated in FIG. 7, a usable time readout unit 44, a determination execution unit 45, and an operation execution unit 46.

The usable time readout unit 44 reads out the usable time of the surveying instrument TSx transmitted from the management server MS and stored in the database 43. The determination execution unit 45 compares the usable time of the surveying instrument TSx and an operating time of the surveying instrument TSx, and based on the determination transmitted from the management server MS and stored in the database 43, executes the determination as to whether the operating time of the surveying instrument TSx is within or outside the usable time. The operation execution unit 46 reads out an operation transmitted from the management server MS and stored in the database 43, and based on results of the determination by the determination execution unit 45, executes the set operation. Hereinafter, these are described in detail.

Figure 8:
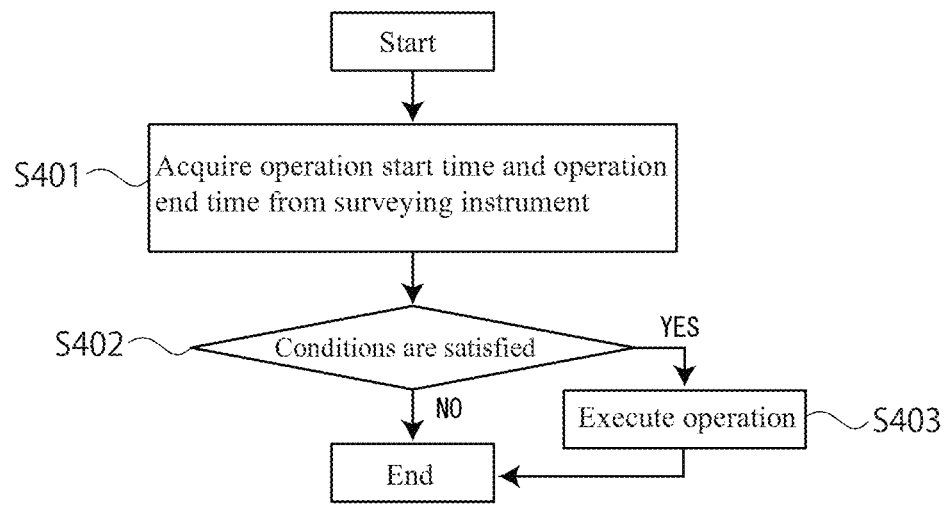
FIG. 8 is a process flowchart of the management server according to the embodiment.

FIG. 8 is a process flowchart of the management server according to the embodiment. First, in Step S401, the management server MS receives an operation start time and an operation end time from the surveying instrument TSx. When the management server MS receives these pieces of time information, the process shifts to Step S402.

Next, when the process shifts to Step S402, the usable time readout unit 44 reads out a usable time of the surveying instrument TSx from the database 43, the determination execution unit 45 knows an operating time of the surveying instrument TSx from the operation start time and/or the operation end time, and compares the operating time of the surveying instrument TSx with the usable time. For example, when receiving both of the operation start time and the operation end time, the determination execution unit 45 compares the operation start time and the operation end time with the usable time. When receiving only the operation start time, the determination execution unit 45 compares the operation start time with the usable time, and then, additionally receives the operation end time, and compares the operation end time with the usable time. When a determination condition is not satisfied, the management server MS ends the process. On the other hand, when the determination condition is satisfied, the process shifts to Step S403, and the operation execution unit 46 executes a set operation. Then, the management server MS ends the process.

A usage example of the communication management system according to the embodiment is given. An example is given in which the owner of the surveying instrument TSx places restrictions by using this system so as to prevent the surveying instrument TSx from being used by an employee without authorization at a time outside working hours on weekdays.

(1) A user opens the webpage 100 on the remote terminal RC, sets "Usable time: 8:00 to 16:30 on Monday to Friday," "Determination: When used outside the usable time," "Operation: Display warning on surveying instrument TSx and lock functions, and sends notification to the owner of surveying instrument TSx by e-mail" and saves these settings, and closes the webpage 100.

(2) The surveying instrument TSx transmits an operation start time (time of day) to the management server MS after the power supply is turned ON. When receiving the operation start time, the management server MS compares the operation start time and the usable time specified in (1). When the surveying instrument TSx is used within the usable time, the management server MS transmits a normal response to the surveying instrument TSx, and a user can normally use the surveying instrument TSx.

Figure 9:
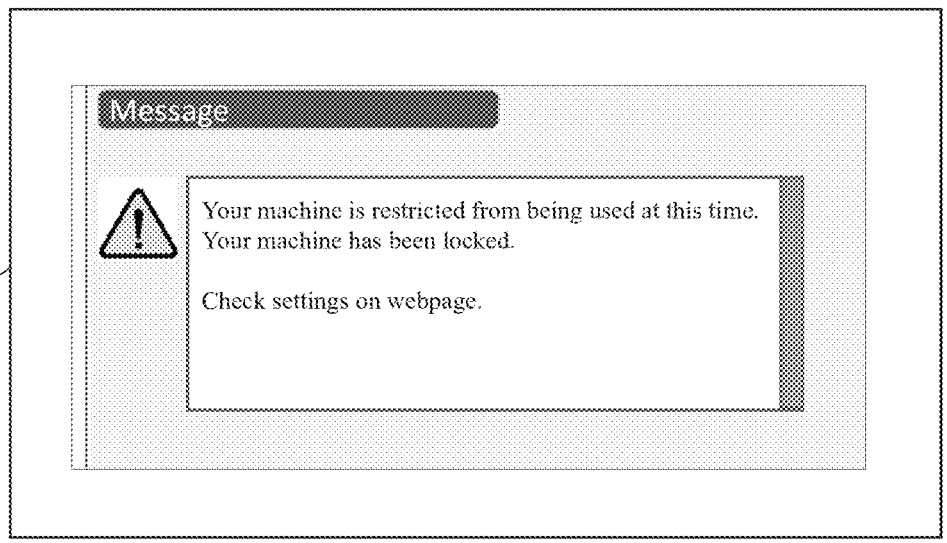
FIG. 9 is an example of a warning displayed on the surveying instrument according to the embodiment.

(3) On the other hand, when use outside the usable time is detected, based on the operation set in (1), the management server MS commands the surveying instrument TSx to display a warning and locks the functions, and sends a notification that the surveying instrument TSx is being used outside the usable time to the owner by e-mail. The surveying instrument TSx that received the command from the management server MS displays a warning on the display unit 17 and stops operations except for turning-OFF of the power supply. FIG. 9 illustrates an example of a warning to be displayed on the surveying instrument according to the embodiment, and as the warning, a message such as "Your machine is restricted from being used at this time. Your machine has been locked. Check settings on webpage." is displayed. The warning may be output by voice when the surveying instrument TSx is equipped with a speaker.

According to the communication management system according to the present embodiment, by setting a usable time of a surveying instrument TSx, determination on an operating time of the surveying instrument and the usable time, and an operation responding to results of the determination in advance, the management server MS monitors whether the surveying instrument TSx is used within the usable time. Then, when the surveying instrument TSx is used outside the usable time, the management server MS promptly makes a response. Therefore, when the surveying instrument TS is used outside the usable time, an owner or an administrator can quickly find this fact.

When the surveying instrument TS is used outside the usable time, the management server MS automatically gives a warning and locks the functions, so that a prompt response can be made to an unauthorized use such as theft or employee's use for improper purposes.

According to the communication management system of the present embodiment, the management server MS always monitors an operation start time and an operation end time of a surveying instrument TS to be managed, so that it can be easily known when the surveying instrument TS is used. Therefore, the administrator can check an operation state of the surveying instrument TS in real time from the remote terminal RC, and can collectively manage a plurality of surveying instruments TS, so that asset management also becomes easy.

The preferred embodiment of the present invention is described above, and the embodiment can be modified based on knowledge of a person skilled in the art, and such an modified embodiment is also included in the scope of the present invention.

REFERENCE SIGNS LIST

TS Surveying instrument
RC Remote terminal
MS Management server
13 Survey unit
14 System timer
15 Control unit
16 Communication unit
31 Terminal communication unit
32 Terminal control unit
33 Terminal display unit
34 Terminal input unit
41 Server communication unit
42 Server control unit
43 Database
44 Usable time readout unit
45 Determination execution unit
46 Operation execution unit
100 Webpage

The invention claimed is:

1. A communication management system of a surveying instrument, comprising:

a surveying instrument including a survey unit configured to survey a target, a system timer configured to acquire a current time, a control unit configured to control the survey unit and the system timer, and a communication unit configured to enable communication between the control unit and a communication network;

a management server capable of communicating with the surveying instrument through the communication network; and a remote terminal capable of communicating with the management server, wherein the remote terminal is configured to set a usable time of the surveying instrument, set a determination on an operating time of the surveying instrument and the usable time, and set an operation responsive to results of the determination, and make the management server store the usable time, the determination, and the operation, wherein the surveying instrument is configured to transmit an operation start time when its own power supply is turned ON and an operation end time when the power supply is turned OFF to the management server, and wherein the management server is configured to acquire the operation start time and the operation end time, and compare the usable time and the operating time of the surveying instrument and execute the determination, and based on the results of the determination, execute the operation.

2. The communication management system of the surveying instrument according to claim 1, wherein, when the operating time of the surveying instrument is determined to be outside the usable time in the results of the determination, as the operation, the server is configured to send a notification to an owner and/or an administrator of the surveying instrument, and/or give a warning to the surveying instrument and/or suspend functions of the surveying instrument.

3. The communication management system of the surveying instrument according to claim 1, wherein the remote terminal is further capable of setting the usable time in a weekly schedule by day of the week.

4. The communication management system of the surveying instrument according to claim 2, wherein the remote terminal is further capable of setting the usable time in a weekly schedule by day of the week.

* * * * *